United States Patent
Ta (10) Patent No.: US 11,224,979 B2
(45) Date of Patent: Jan. 18, 2022

(54) PARALLEL LINK ROBOT (71) Applicant: FANUC CORPORATION, Yamanashi (JP)

(72) Inventor: Kentarou Ta, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/081,171

(22) Filed: Oct. 27, 2020

(65) Prior Publication Data

US 2021/0162612 A1 Jun. 3, 2021

(30) Foreign Application Priority Data

Nov. 29, 2019 (JP) .............................. JP2019-216659

(51) Int. Cl.
*B25J 17/02* (2006.01)
(52) U.S. Cl.
CPC ....... *B25J 17/0266* (2013.01); *B25J 17/0275* (2013.01)
(58) Field of Classification Search
CPC .. B25J 17/0266; B25J 17/0275; B25J 9/0051; B25J 17/0258; F16C 21/005; F16C 27/08; F16C 27/06; F16D 3/06; F16D 3/16
USPC ...................................................... 74/490.05
See application file for complete search history.

(56) References Cited

U.S. PATENT DOCUMENTS

| | | | | |
|---|---|---|---|---|
| 8,210,068 B2* | 7/2012 | Feng | ...................... | B25J 9/0051 74/490.05 |
| 8,307,732 B2* | 11/2012 | Kinoshita | .............. | B25J 9/0051 74/490.01 |
| 8,429,998 B2* | 4/2013 | Feng | ...................... | B25J 9/0051 74/490.1 |
| 8,714,903 B2* | 5/2014 | Feng | ...................... | B25J 9/0051 414/735 |
| 9,168,657 B2* | 10/2015 | Uemura | .................. | B25J 9/0051 |
| 9,694,493 B2* | 7/2017 | Souk | ..................... | B25J 9/0078 |
| 10,160,120 B2* | 12/2018 | Hirano | ................. | B25J 19/0025 |
| 2010/0005919 A1* | 1/2010 | Breu | .................... | B25J 17/0266 74/490.05 |

(Continued)

FOREIGN PATENT DOCUMENTS

| | | |
|---|---|---|
| JP | 4653848 B1 | 3/2011 |
| JP | 2011-088262 A | 5/2011 |

(Continued)

*Primary Examiner* — Jake Cook
*Assistant Examiner* — Gregory Robert Weber
(74) *Attorney, Agent, or Firm* — Maier & Maier, PLLC (57) ABSTRACT

A parallel link robot includes: a base part; a movable part including an accessory shaft; arms coupling the base and movable parts in parallel; and actuators that drive the respective arms, where each of the arms includes a driving link driven by each of the actuators, and two parallel passive links coupled to the driving link, between the passive links of at least one of the arms, an additional actuator having a rotating shaft disposed in parallel to the passive links is supported by a first link swingably coupled to each of the passive links, the accessory shaft, and the rotating shaft are coupled by a transmission shaft, and the transmission shaft is supported, at an intermediate position in a direction along a longitudinal axis thereof, on a second link rotatably around the longitudinal axis, the second link being swingably coupled to each of the passive links.

5 Claims, 10 Drawing Sheets

(56) References Cited

U.S. PATENT DOCUMENTS

| | | | |
|---|---|---|---|
| 2011/0033275 A1* | 2/2011 | Lehmann | B25J 19/0025 |
| | | | 414/737 |
| 2011/0097184 A1 | 4/2011 | Kinoshita et al. | |
| 2014/0060234 A1 | 3/2014 | Uemura | |
| 2019/0061144 A1 | 2/2019 | Yamamoto | |

FOREIGN PATENT DOCUMENTS

| JP | 2014-046434 A | 3/2014 |
|---|---|---|
| JP | 2019-038051 A | 3/2019 |

* cited by examiner

PARALLEL LINK ROBOT

CROSS-REFERENCE TO RELATED APPLICATIONS

This application claims the benefit of Japanese Patent Application No. 2019-216659, the content of which is incorpo-rated herein by reference.

FIELD

The present disclosure relates to a parallel link robot.

BACKGROUND

There is known a parallel link robot including a plurality of arms coupling a base part and a movable part in parallel (see Japanese Unexamined Patent Application, Publication No. 2019-38051 for example). Each arm includes a driving link driven by an actuator, and two parallel passive links coupled to the driving link. An actuator for driving a wrist shaft provided in the movable part is disposed between the two passive links in parallel, and is supported by an auxiliary link laid between the passive links. The actuator and the wrist shaft are connected by a power transmission shaft.

SUMMARY

An aspect of the present disclosure is a parallel link robot including: a base part; a movable part including an accessory shaft; a plurality of arms that couple the base part and the movable part in parallel; and a plurality of actuators that are disposed in the base part, and drive the respective arms, wherein each of the arms includes a driving link driven by each the actuators, and two parallel passive links coupled to the driving link by joints, between the two passive links of at least one of the arms, an additional actuator having a rotating shaft disposed in parallel to the passive links is supported by a first auxiliary link laid between the passive links and swingably coupled to each of the passive links, the accessory shaft, and the rotating shaft of the additional actuator are coupled by a power transmission shaft, and the power transmission shaft is supported, at an intermediate position in a direction along a longitudinal axis of the power transmission shaft, on a second auxiliary link rotatably around the longitudinal axis by a bearing, the second auxiliary link being laid between the passive links and swingably coupled to each of the passive links.

DETAILED DESCRIPTION OF EMBODIMENTS

A parallel link robot 1 according to an embodiment of the present disclosure will be described hereinafter with reference to the drawings.

Figure 1:
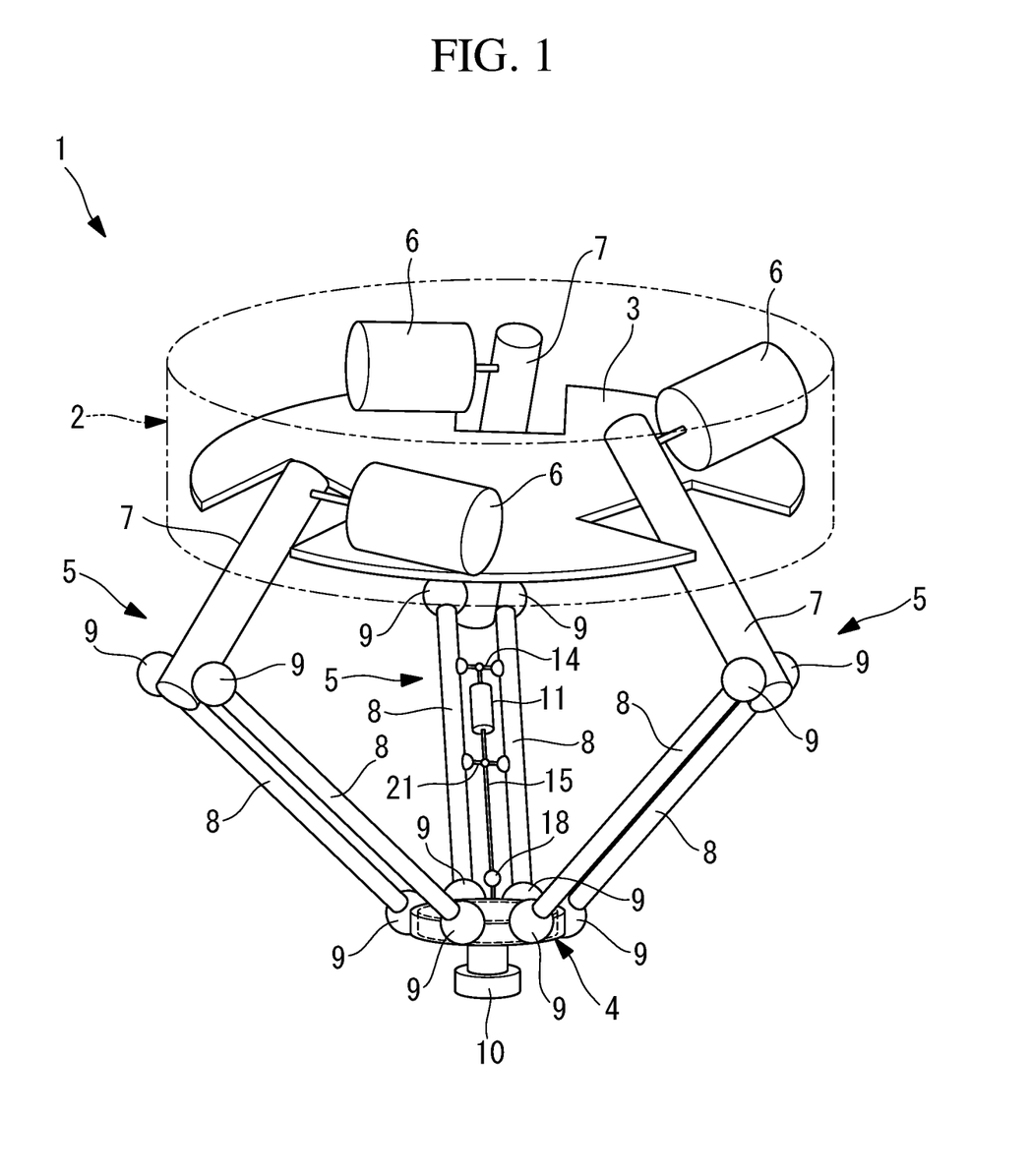
FIG. 1 is a perspective view illustrating a parallel link robot according to an embodiment of the present disclosure.

As illustrated in FIG. 1, the parallel link robot 1 according to this embodiment includes a base part 3 housed in a housing 2, a disk-like movable plate (movable part) 4, and three arms 5 that couple the base part 3 and the movable plate 4 in parallel.

In the base part 3, three actuators 6 that drive the respective arms 5 are provided. The actuators 6 are each composed of a servo motor and a reducer, for example.

Each arm 5 includes a driving link 7 swung by the actuator 6, and two parallel passive links 8 swingably coupled to the driving link 7.

Both ends of each of the two passive links 8 are each swingably connected to the driving link 7 and the movable plate 4 by a ball joint (joint) 9. That is, the driving link 7, the two passive links 8, and the movable plate 4 constitute a parallel four-bar linkage. Consequently, even when the angle of each passive link 8 to the driving link 7 is changed, a quadrangle obtained by sequentially connecting the four ball joints 9 by a straight line is always a parallelogram.

A wrist shaft (accessory shaft) 10 rotationally driven around a center axis X of the movable plate 4 is provided in the movable plate 4.

Figure 2:
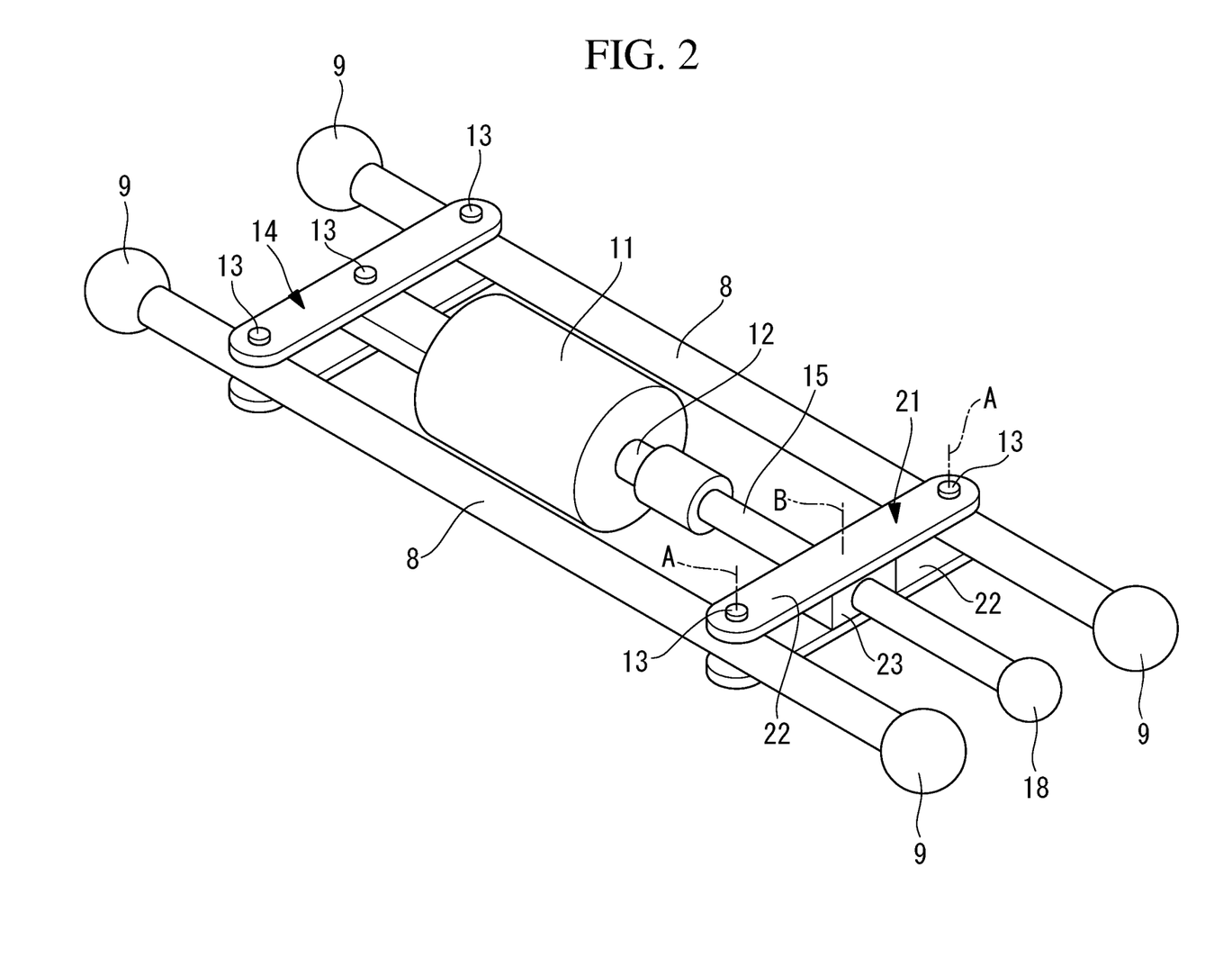
FIG. 2 is a perspective view illustrating an additional actuator and passive links of one arm of the parallel link robot of FIG. 1.

As illustrated in FIG. 2, an additional actuator 11 for driving the wrist shaft 10 is disposed between the two passive links 8 of the one arm 5 such that a rotating shaft 12 is in parallel with the passive links 8. The additional actuator 11 is, for example, a servo motor.

As illustrated in FIG. 2, the additional actuator 11 is supported by an auxiliary link (first auxiliary link) 14 that is laid between the two passive links 8, and that is swingably coupled to the respective passive links 8 by bearings 13. That is, the additional actuator 11 has one end swingably connected to a central portion of the auxiliary link 14 by a bearing 13.

Figure 3:
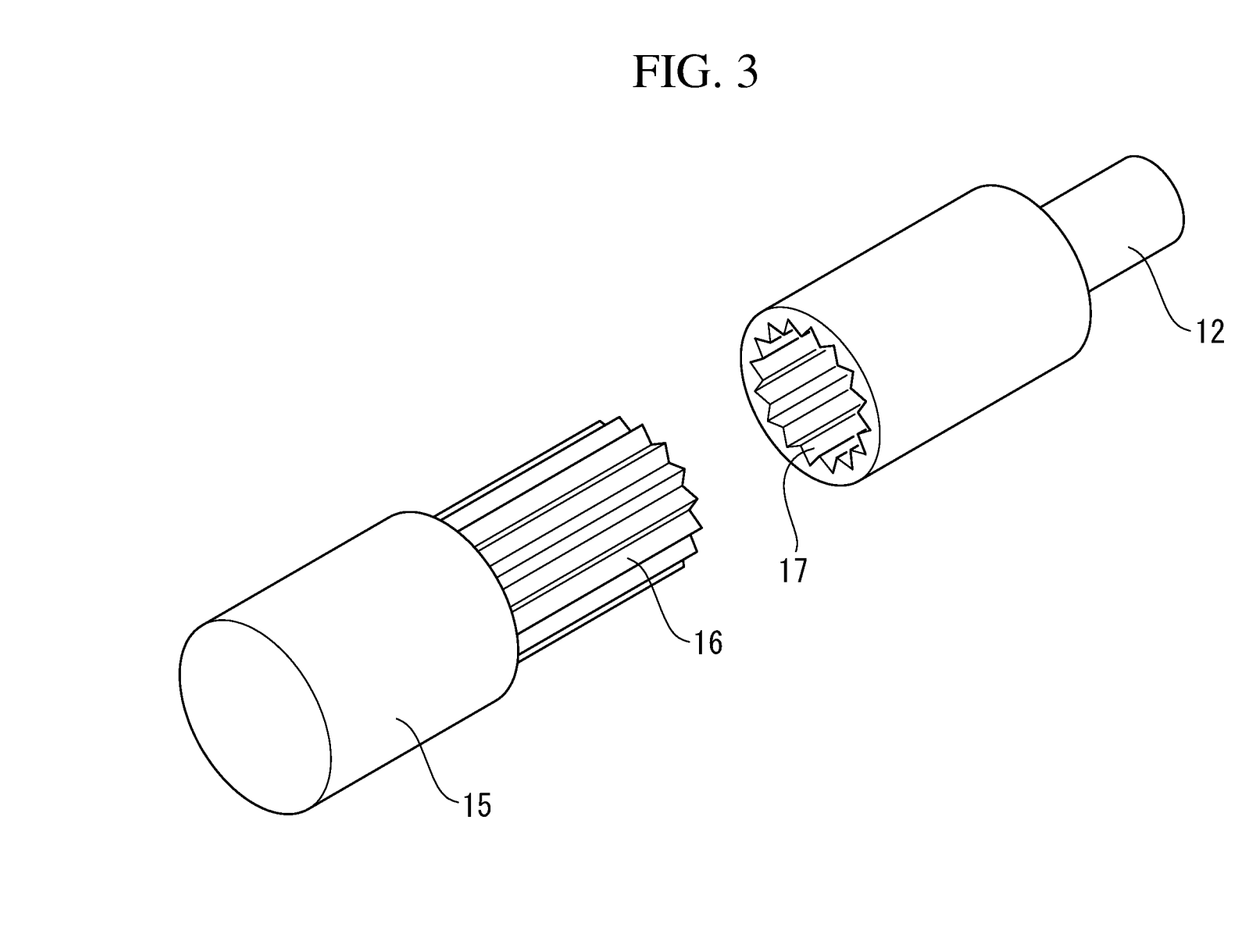
FIG. 3 is a perspective view illustrating a connecting part of the additional actuator of FIG. 2 and a power transmission shaft.

One end of a power transmission shaft 15 extending in the direction in which the rotating shaft 12 extends is connected to the rotating shaft 12 of the additional actuator 11. As illustrated in FIG. 3, for example, a spline 16 and a spline hole 17 are fitted to each other, so that the rotating shaft 12 and the power transmission shaft 15 are connected so as to be movable in the direction along the rotating shaft 12. Consequently, the rotating shaft 12 is rotated by the additional actuator 11, so that the power transmission shaft 15 is rotated around a longitudinal axis C.

The power transmission shaft 15 has the other end connected to the wrist shaft 10 by a universal joint 18.

Figure 4:
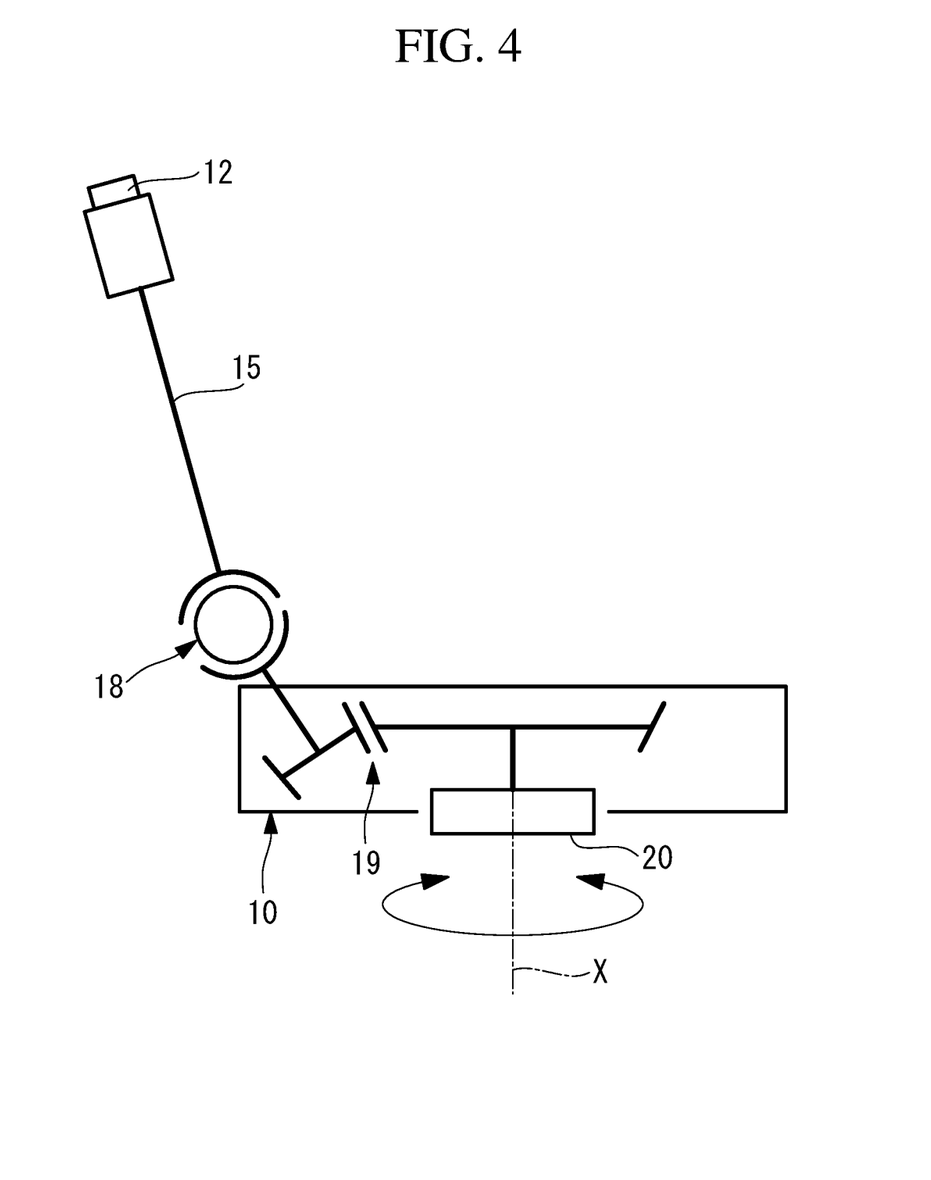
FIG. 4 is a schematic diagram illustrating a structure of a wrist shaft of the parallel link robot of FIG. 1.

FIG. 4 illustrates an example of the wrist shaft 10. Rotation of the power transmission shaft 15 is transmitted to the wrist shaft 10 through the universal joint 18, a mounting flange 20 at a leading end is rotated round the center axis X of the movable plate 4 through a gear pair 19.

In this embodiment, as illustrated in FIG. 2, the power transmission shaft 15 is also supported at an intermediate position in the longitudinal axis C direction by an auxiliary link (second auxiliary link) 21 laid between the two passive links 8, and swingably coupled to the passive links 8 by bearings 13. The auxiliary link 21 includes link bodies 22 supported on the passive links 8 swingably around mutually parallel swing axes A, and a support member 23 supported swingably with respect to the link bodies 22 around an axis B parallel to the swing axes A.

Figure 5:
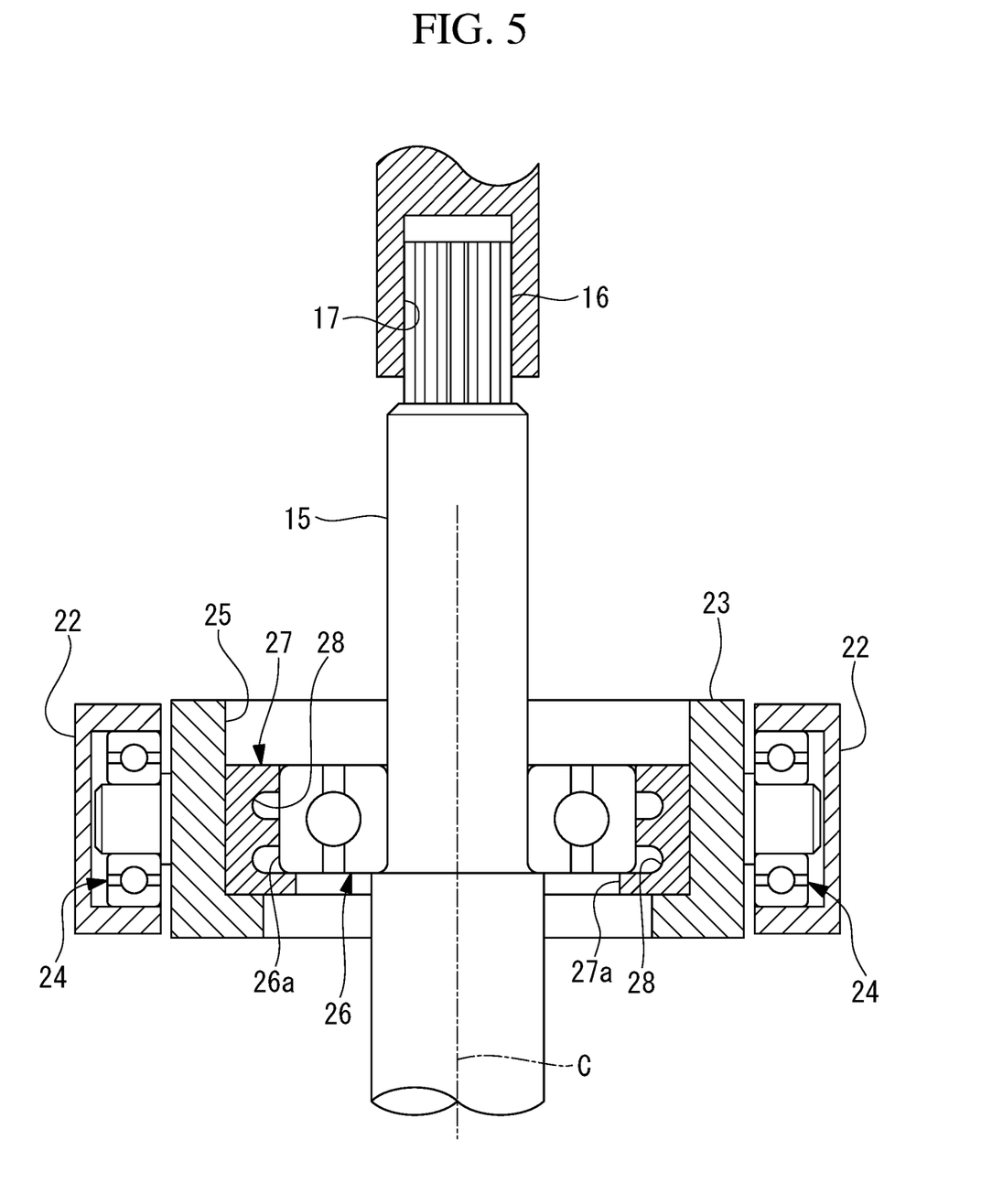
FIG. 5 is a longitudinal sectional view illustrating a bearing and a second auxiliary link supporting the power transmission shaft of the parallel link robot of FIG. 1.

As illustrated in FIG. 5, the support member 23 is swingably supported on the link bodies 22 by bearings 24, and includes a through hole (hole) 25 for allowing the power transmission shaft 15 to penetrate at a center. The power transmission shaft 15 is supported on the support member 23 rotatably around the longitudinal axis C by a bearing 26 disposed between the through hole 25 and the transmission shaft 15.

According to this embodiment, a cylindrical elastic body 27 that supports the bearing 26 so as to enable the bearing 26 to slightly move in the longitudinal axis C direction of the power transmission shaft 15 by elastic deformation is disposed between the through hole 25 of the support member 23 and an outer ring 26a of the bearing 26.

Figure 6:
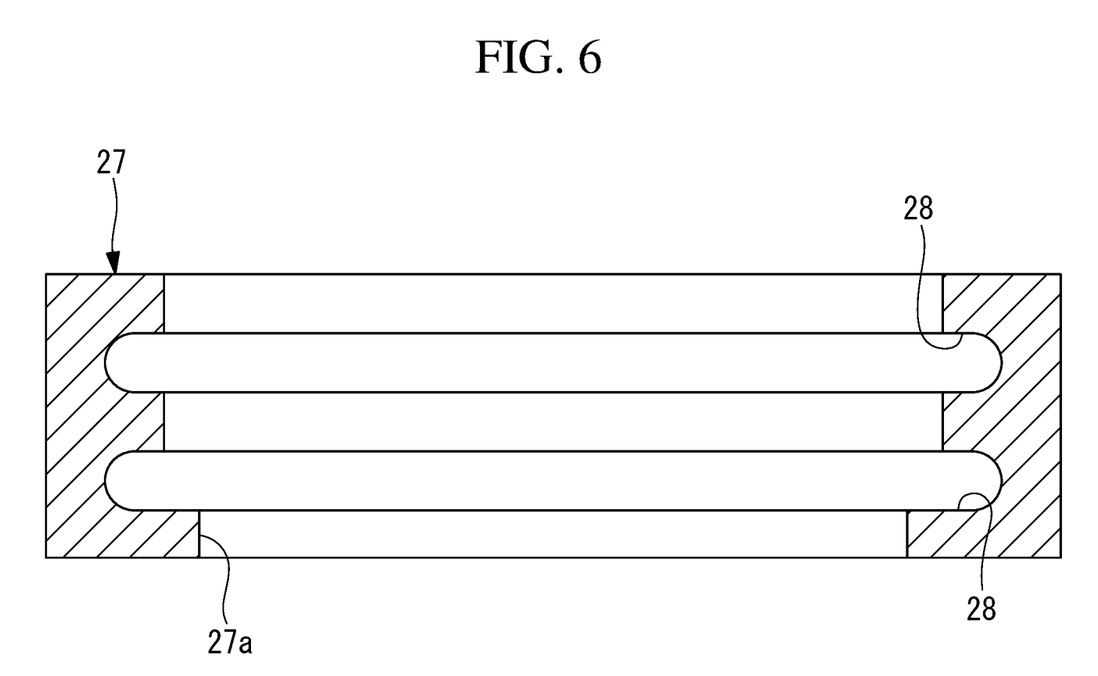
FIG. 6 is a longitudinal sectional view illustrating an elastic body disposed between the bearing of FIG. 5 and a support member.

As illustrated in FIG. 6, a rigidity reduction structure for greatly reducing rigidity of the elastic body 27 along the axial direction compared to rigidity of the elastic body 27 along the radial direction is provided in the elastic body 27. The rigidity reduction structure is composed of, for example, two circumferential grooves (grooves) 28 that are provided in an inner circumferential surface of the cylindrical elastic body 27 at an interval in the axial direction, and that are recessed radially outward over the whole circumference.

In an example of FIG. 6, annular regions each having a thickness of ¼ of the axial length of the bearing 26 in the elastic body 27 are in close contact with two portions of an outer circumferential surface of the outer ring 26a of the bearing 26 at an interval in the axial direction. In this case, the rigidity of the elastic body 27 is reduced in the axial direction compared to a case where the circumferential grooves 28 are not provided, and the annular region is in close contact over the whole thickness in the axial direction of the bearing 26. On the other hand, the rigidity of the elastic body 27 is reduced in the radial direction. In FIG. 6, reference numeral 27a denotes a shoulder part that is disposed on one side in the axial direction of the elastic body 27, and abuts on the outer ring 26a of the bearing 26 in the axial direction.

Figure 7:
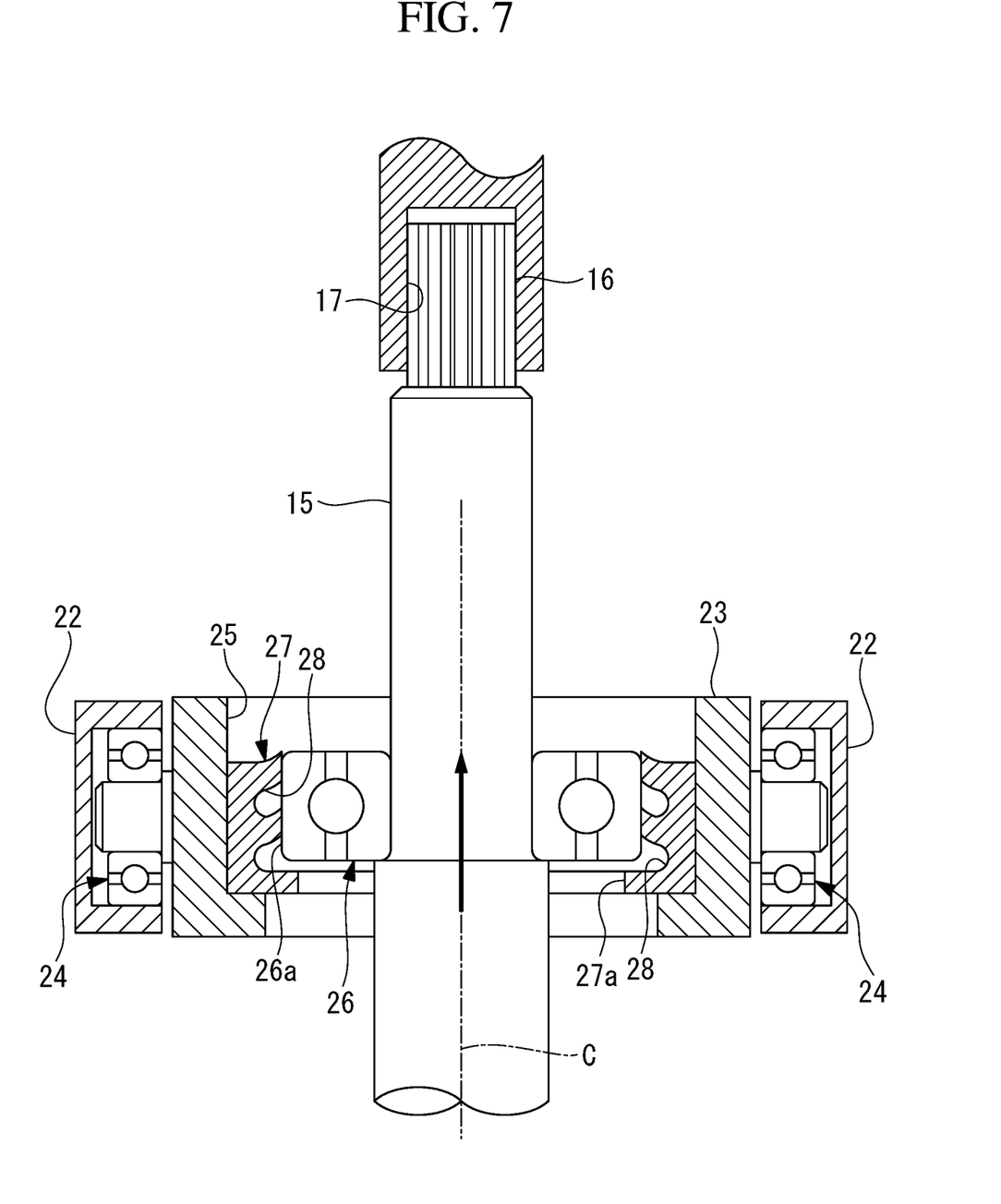
FIG. 7 is a longitudinal sectional view illustrating action of the elastic body.

The elastic body 27 is formed of, for example, resin, and is maintained in a state of being in close contact with the outer circumferential surface of the outer ring 26a of the bearing 26 and an inner circumferential surface of the through hole 25 of the support member 23 as illustrated in FIG. 5. When force in the direction along the longitudinal axis C acts on the power transmission shaft 15, the bearing 26 can be slightly moved in the direction along the longitudinal axis C by elastic deformation of the elastic body 27, as illustrated in FIG. 7.

An operation of the parallel link robot 1 thus configured, according to this embodiment will be hereinafter described.

Figure 8:
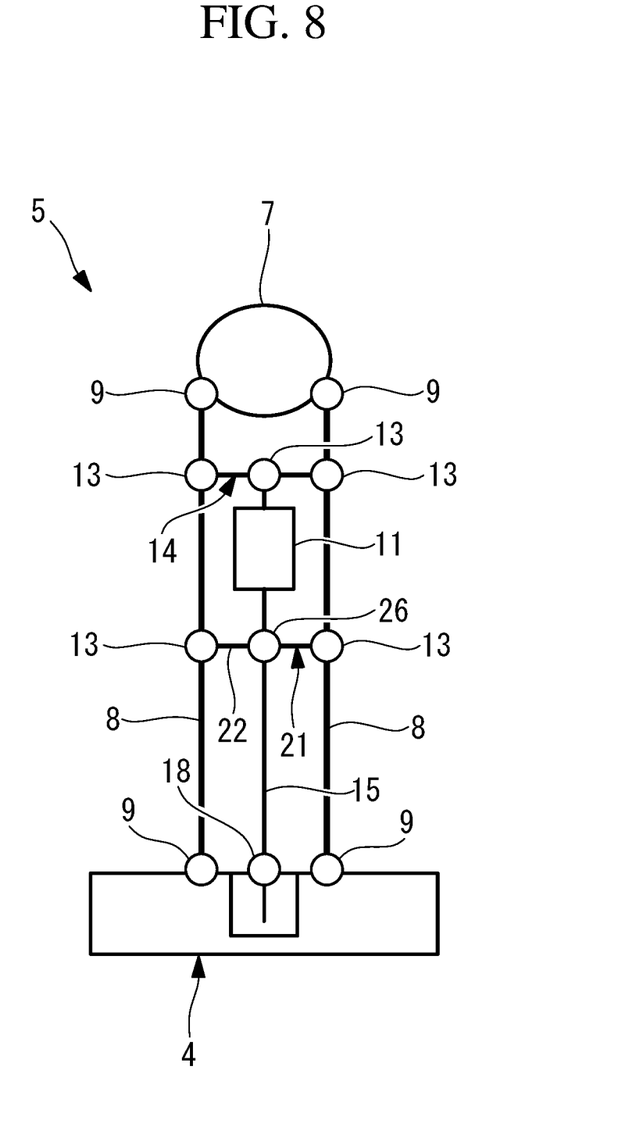
FIG. 8 is a schematic diagram illustrating motion of the additional actuator and the passive link of the arm of FIG. 2.
Figure 9:
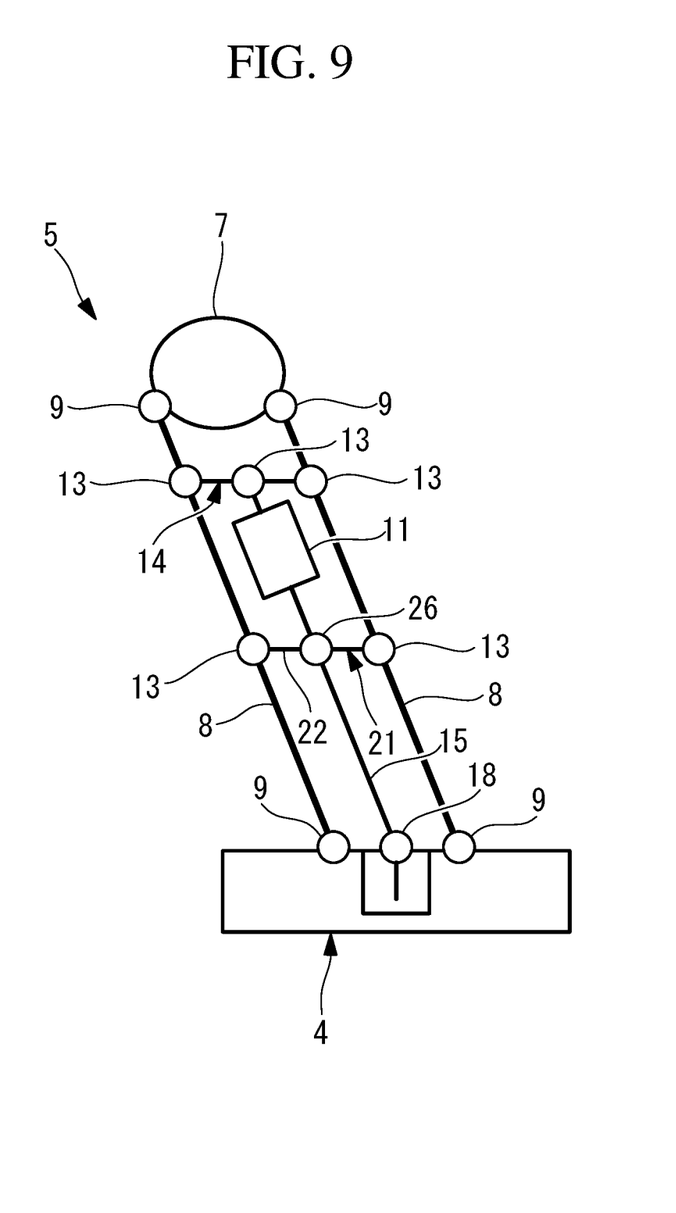
FIG. 9 is a schematic diagram illustrating a state in which a movable plate is moved from a state of FIG. 8.

FIG. 8 and FIG. 9 are each a schematic drawing for illustrating motion of the passive links 8 of the one arm 5 when the movable plate 4 moves. As is apparent from these drawings, the two passive links 8 are parallel to each other before and after the movable plate 4 moves. Then, the additional actuator 11 and the power transmission shaft 15 are also maintained in parallel to the two passive links 8.

That is, the two passive links 8 and the power transmission shaft 15 are always parallel to each other, and the lengths thereof are not changed. Therefore, ideally, the auxiliary link 21, the passive links 8, the movable plate 4, and the power transmission shaft 15 also constitute a parallel four-bar linkage.

However, in reality, when the length of the power transmission shaft 15 is increased, the power transmission shaft 15 receives external force in the direction orthogonal to the longitudinal axis C by the inertia amount of the power transmission shaft 15 itself during operation of the arm 5. In a case where the power transmission shaft 15 is deflected by external force, and a dimension error, an assembly error, abrasion, or the like occurs, the aforementioned ideal parallel four-bar linkage is broken. In this case, a distance between the auxiliary link 21 and the universal joint 18 is changed, and therefore the power transmission shaft 15 moves in the longitudinal axis C direction with respect to the additional actuator 11.

According to this embodiment, the power transmission shaft 15 is supported, at the intermediate position, on the auxiliary link 21 laid between the two passive links 8, rotatably around the longitudinal axis C by the bearing 26. Therefore, there is an advantage that external force that acts in the direction intersecting with the longitudinal axis C is supported by the two passive links 8 through the bearing 26 and the auxiliary link 21, and it is possible to sufficiently suppress occurrence of deflection of the power transmission shaft 15 during the operation of the arm 5.

In a case where the ideal parallel four-bar linkage is broken by the aforementioned cause, the power transmission shaft 15 sometimes moves in the longitudinal axis C direction, and the movement is absorbed by spline coupling at a connecting part of the additional actuator 11 and the power transmission shaft 15. On the other hand, the bearing 26 that rotatably supports the power transmission shaft 15 on the auxiliary link 21 supports the power transmission shaft 15 so as to enable the power transmission shaft 15 to slightly move in the longitudinal axis C direction by the elastic body 27.

As a result, even when the arm 5 moves in a state in which the parallel four-bar linkage is broken, and the power transmission shaft 15 moves in the longitudinal axis C direction, the elastic body 27 is elastically deformed, and the bearing 26 moves in the longitudinal axis C direction of the power transmission shaft 15. Consequently, there is an advantage that while the power transmission shaft 15 is supported rotatably around the longitudinal axis C by the bearing 26, excessive thrust force can be prevented from acting on the bearing 26.

Particularly, in this embodiment, the circumferential grooves 28 that compose the rigidity reduction structure for greatly reducing axial rigidity compared to radial rigidity is provided in the cylindrical elastic body 27, and therefore while the deflection of the power transmission shaft 15 is reliably prevent, thrust force applied to the bearing 26 can be reduced.

There is an advantage that as the rigidity reduction structure, a simple structure in which the circumferential grooves 28 is merely provided in the inner circumferential surface of the elastic body 27 is employed, so that it is possible to obtain a compact configuration without increase of the outer diameter of the elastic body 27.

In this embodiment, as the rigidity reduction structure provided in the elastic body 27, the two circumferential grooves 28 provided in the inner circumferential surface of the cylindrical elastic body 27 are exemplified. In place of this, the one or three or more circumferential grooves 28 may be employed. The shape of each circumferential groves 28 may be an arbitrary shape such as a U-shaped groove in which a cross-section of a bottom surface is an arc, a rectangular groove having a rectangle, and a V-shaped groove.

In place of a plurality of the independent circumferential grooves 28, a spirally continued groove may be employed.

The circumferential grooves 28 that compose the rigidity reduction structure are provided in the inner circumferential surface of the cylindrical elastic body 27. However, in place of the above, the circumferential groove may be provided in the outer circumferential surface, or the circumferential grooves may be provided in both the inner circumferential surface and the outer circumferential surface.

Figure 10:
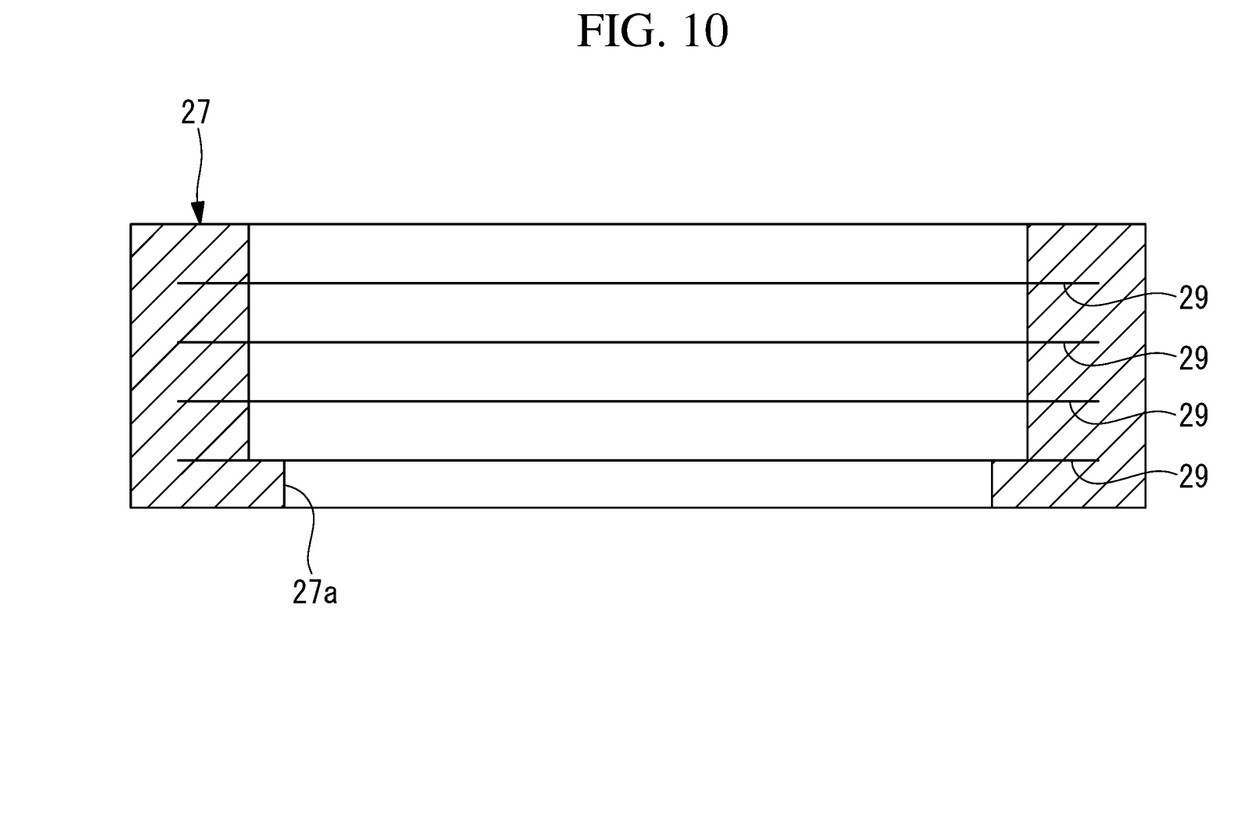
FIG. 10 is a longitudinal sectional view illustrating a modification of the elastic body of FIG. 6.

As the rigidity reduction structure, in place of the circumferential grooves 28, as illustrated in FIG. 10, one or more slits 29 radially extending along the circumferential direction may be provided in at least one of the inner circumferential surface and the outer circumferential surface of the elastic body 27. In this case, the rigidity of the elastic body 27 is reduced in the axial direction, and is not reduced in the radial direction, compared to a case where any slit 29 is not provided, and the annular region is in close contact over the whole thickness in the axial direction of the bearing 26 in the elastic body 27. The elastic body 27 may be composed by stacking of a plurality of annular ring plates in the plate thickness direction.

The invention claimed is:

1. A parallel link robot comprising:
a base part;
a movable part including an accessory shaft;
a plurality of arms that couple the base part and the movable part; and
a plurality of arm actuators that are disposed in the base part, and drive the respective arms, wherein
each of the arms includes a driving link driven by each of the actuators, and two parallel passive links coupled to the driving link by a joint, each of the arm actuators are configured to drive the individual driving links,
an additional actuator, which is different from the arm actuators and which is provided between the two passive links of at least one of the arms, the additional actuator comprises a body and a rotating shaft, the body of the additional actuator is supported by a first auxiliary link which is laid between the passive links and which is swingably coupled to each of the passive links,
the accessory shaft; and the rotating shaft of the additional actuator are coupled by a power transmission shaft, an accessory-shaft end of the power transmission shaft is provided with a universal joint for transmitting rotation force of the power transmission shaft to the accessory shaft, and
a second auxiliary link is provided to be laid between the passive links and to be swingably coupled to each of the passive links, the second auxiliary link is located at an accessory-shaft side relative to the first auxiliary link to rotatably support the power transmission shaft, the second auxiliary link is located at a position between the rotating shaft and the universal joint.

2. A parallel link robot comprising,
a base part;
a movable part including an accessory shaft;
a plurality of arms that couple the base part and the movable part; and
a plurality of arm actuators that are disposed in the base part, and drive the respective arms, wherein
each of the arms includes a driving link and two parallel passive links coupled to the driving link by a joint, the arm actuators are configured to drive the individual driving links,
an additional actuator, which is different from the arm actuators and which is provided between the two passive links of at least one of the arms, the additional actuator comprises a rotating shaft, the additional actuator is supported by a first auxiliary link which is laid between the passive links and which is swingably coupled to each of the passive links,
the accessory shaft and the rotating shaft of the additional actuator are coupled by a power transmission shaft, and
a second auxiliary link is provided to be laid between the passive links and to be swingably coupled to each of the passive links, and the second auxiliary link comprises a bearing which rotatably supports the power transmission shaft, wherein
the second auxiliary link includes a link body supported on the two passive links swingably around parallel swing axes, and a support member swingably supported around an axis parallel to the swing axes with respect to the link body,
the bearing is provided in the support member, and
an elastic body that supports the bearing so as to enable the bearing to be slightly movable in a direction along a longitudinal axis of the power transmission shaft by elastic deformation is provided between the support member and the bearing.

3. The parallel link robot according to claim 2, wherein the elastic body is cylindrically formed so as to be interposed between an outer ring of the bearing and a hole of the support member, and
a rigidity reduction structure for reducing axial rigidity compared to radial rigidity is provided in the elastic body.

4. The parallel link robot according to claim 3, wherein the rigidity reduction structure comprises one or more grooves extending along a circumferential direction in at least one of an inner circumferential surface and an outer circumferential surface of the elastic body.

5. The parallel link robot according to claim 3, wherein the rigidity reduction structure comprises one or more slits radially extending along a circumferential direction in at least one of an inner circumferential surface and an outer circumferential surface of the elastic body.

* * * * *